Feb. 13, 1962  A. J. MILLER ETAL  3,020,661
METHOD OF POLISHING AND DEFLASHING MOLDED PLASTIC ARTICLES
Filed Sept. 28, 1959

INVENTORS
Andrew J. Miller
Urban P. Nellis
BY Richard C. Waymire

Their Attorney 3,020,661
METHOD OF POLISHING AND DEFLASHING MOLDED PLASTIC ARTICLES
Andrew J. Miller and Urban P. Nellis, Dayton, and Richard C. Waymire, Brookville, Ohio, assignors to General Motors Corporation, Detroit, Mich., a corporation of Delaware
Filed Sept. 28, 1959, Ser. No. 842,637
4 Claims. (Cl. 41—41)

This invention relates to a method for finishing plastic materials and is particularly concerned with a finishing method which will enhance the appearance of the plastic and simultaneously remove mold flash therefrom in a single operation.

It is, therefore, the main object of this invention to provide an improved method for finishing plastics wherein the surface finish of the material can be enhanced to improve the gloss thereon and simultaneously mold flash can be removed from the article whereby a more or less continuous surface is provided without interruption where the flash had previously been positioned.

In carrying out the above object, it is a further object to vapor-buff plastic articles and, specifically, articles formed from cellulose acetate butyrate and cellulose acetate propionate in the vapor of a solvent material maintained at a temperature sufficiently high to dissolve the mold flash but below the melting point of the plastic being treated.

In carrying out the above object, it is a further object to vapor-buff plastic articles as they come from the mold wherein the articles are suspended in a chamber and are surrounded with the vapor of a solvent material maintained at an elevated temperature below the melting point of the plastic material for a time sufficient to cause a leveling of the surface of the article and a dissolution of mold flash therefrom whereby a continuous smooth surface is provided having improved appearance over surfaces heretofore made possible without vapor buffing.

Another object of the invention is to reduce the cost of finishing cellulose acetate butyrate and cellulose acetate propionate molded articles by utilizing a single finishing operation requiring few, if any, of the usual manual operations.

A more specific object of the invention is to provide a method for finishing automotive steering wheels including a metallic spider covered over with a covering of cellulose acetate butyrate or cellulose acetate propionate wherein the plastic covering is molded onto the spider in a two-part mold and wherein the finishing operation comprises suspending the steering wheel with the mold flash thereon in an atmosphere of a solvent, such as methyl ethyl ketone or trichloroethylene, maintained at a temperature of above the boiling point of the solvent and below the melting point of the plastic for a time sufficient to level out the surface of the plastic for providing a polished surface thereon having a high gloss and simultaneously for removing the mold flash from the plastic surface of the wheel.

Further objects and advantages of the present invention will be apparent from the following description, reference being had to the accompanying drawings wherein preferred embodiments of the present invention are clearly shown.

Figure 1:
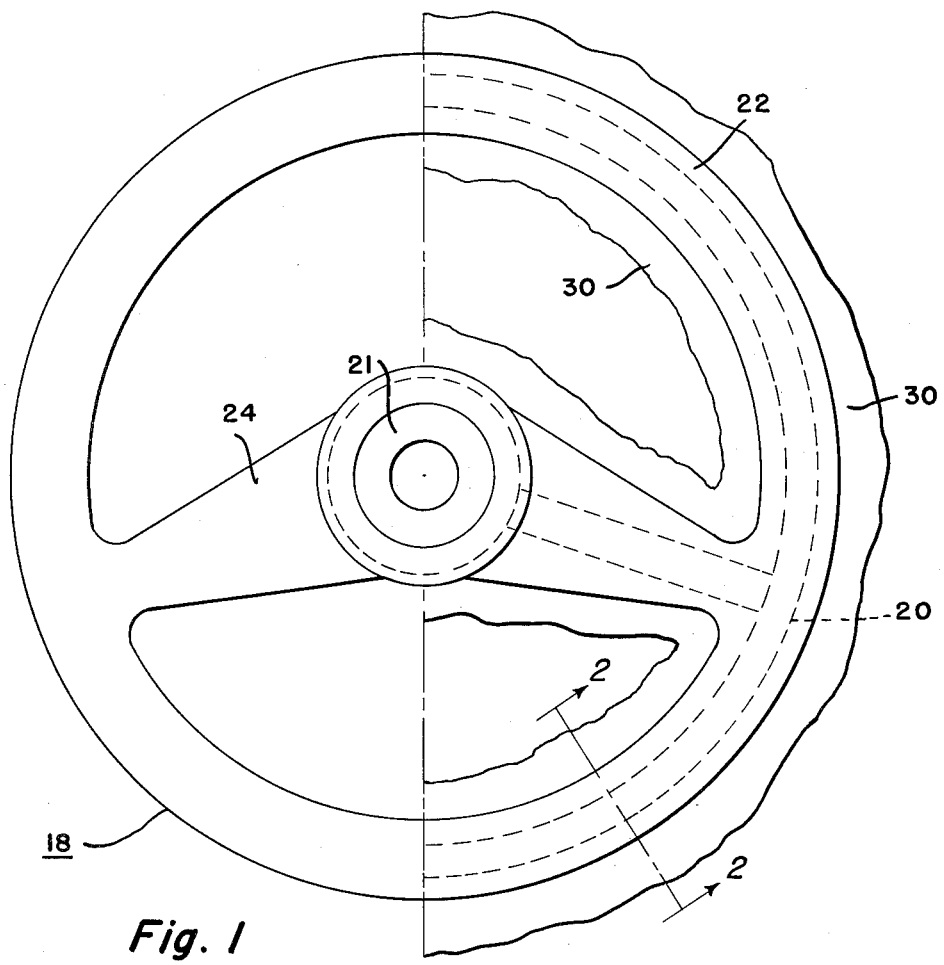
FIGURE 1 shows a steering wheel wherein the mold flash is indicated on one-half of the steering wheel only while the other half of the wheel is shown in the finished condition after passing through the process described hereinafter.
Figure 2:
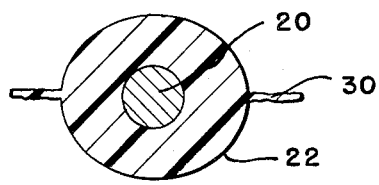
FIGURE 2 is a view taken on line 2—2 of FIGURE 1 showing a section of the wheel rim.

In the manufacture of an automotive steering wheel 18, a steel spider 20 is positioned in a separable two-part mold and is held spaced from the walls thereof either by the hub portion 21 or by chaplets provided in the mold. A thermoplastic resin material is then injected into the mold at a temperature sufficiently high to render the material flowable to completely cover the spider both at the wheel portion 22 thereof and at the spoke portions 24 thereof to form a plastic covered reinforced wheel wherein the spider 20 is coextensively covered by the plastic for forming a wheel having the desired attractive appearance for present day automotive use.

During this molding operation, mold flash 30, shown in exaggerated form at the right-hand side of FIGURE 1, seeps out along the parting line of the mold in the form of a very thin attached fin. When the molded steering wheel is removed from the mold, it is necessary for an operator to remove this fin or flash 30 from around the parting line of the wheel and along the spokes. This removal is accomplished manually with a knife and is expensive, requires great care and is time consuming. Furthermore, if the operator is not adept at the operation, there is a possibility of marring the surface of the wheel as the flash is cut therefrom and this causes many wheels to be rejected which otherwise are satisfactory. After the flash has been cut off the wheel, it is necessary to buff the cut surface of the plastic to re-establish its surface finish and, here again, a manual operation is required which is time consuming and quite costly.

The present invention is directed to a method for finishing plastics and steering wheels in particular wherein all of these manual operations are substantially eliminated and wherein flash is removed from the wheel and the wheel is simultaneously enhanced in appearance without the use of manual cutting or buffing.

This is accomplished by a vapor treatment which may be termed "vapor buffing" in that the wheel is suspended in an atmosphere of a solvent vapor for a time sufficient to remove the flash and to level out the surface of the wheel and, thus, enhance its over-all appearance. The wheel, at the conclusion of this vapor-buffing treatment, is the finished product and this is accomplished without the usual manual operations.

Specifically, the vapor buffing is accomplished in a confined atmosphere of solvent vapor maintained at an elevated temperature and at atmospheric pressure in the preferred embodiment. For example, when operating on cellulose acetate butyrate-covered steering wheels, the steering wheels are immersed in a vapor bath of trichloroethylene, methyl ethyl ketone, etc. The temperature of the vapor bath may vary between the boiling point of the solvent and the melting point of the cellulose acetate butyrate and the period of immersion will vary inversely as the temperature. Trichloroethylene boils at about 185° F. while methyl ethyl ketone boils at about 176° F. Cellulose acetate butyrate will melt in the vicinity of 250° F. For this reason, the treatment should be within this range and in order to remove critical factors, should preferably be within the neighborhood of 190° F.–195° F. whereby no possible harm can come to the cellulose acetate butyrate. It is pointed out that the softening range for this specific plastic ranges between about 140° F. and 250° F. and it is quite apparent that the vapor treatment should preferably be carried out at temperatures well below the maximum softening temperature unless critical controls are maintained. In general, however, best results can be obtained by trial methods to determine the optimum temperature with respect to flash removal, appearance of the wheel and time involved.

Most ketones are known solvents for cellulose acetate butyrate and propionate. Similarly, most esters are satisfactory solvents for the same purpose and, therefore, any ketone or ester may be chosen that has a boiling point falling within the softening range of the plastic. For example, acetone, ethyl acetate, methyl ethyl ketone, mixtures of the aforementioned and trichloroethylene are all good solvents for these particular materials.

For practical purposes, however, methyl ethyl ketone or trichloroethylene have the desired solvent properties, boil at satisfactory temperatures and are inexpensive and, therefore, are the prefered materials with respect to the present method.

We have found that a steering wheel having a covering of cellulose acetate butyrate immersed in trichloroethylene vapor at 190° F. will be vapor-buffed satisfactorily in a period of from 1 to 2 minutes. The upper end of the range will provide a high gloss to the material since any surface imperfections appear to be leveled out by the solvent action of the vapor while the flash is simultaneously removed. Instead of trichloroethylene, methyl ethyl ketone may be used under the same conditions with satisfactory results and, similarly, cellulose acetate proprionate-covered wheels may be operated upon under like conditions.

The specific apparatus used is of no particular importance and we have found that commercial degreasing apparatus provides an inexpensive set-up for this purpose. Various types of commercial degreasers are shown in the publication "Metal Degreasing" published by E. I. duPont in July, 1955. Any of the apparatus shown may be used for the purposes at hand with the understanding that the work to be de-flashed is not contacted by the liquid phase of the solvent. In other words, these degreasers need only be modified to this extent for use in the present process. Both automatic and intermittent set-ups are disclosed in this publication. In all cases, the vat containing the solvent must be heated and a chamber must be provided thereabove of sufficient volume to accommodate the wheels. Above the vapor, a cooled zone is provided for re-condensing the vapor whereby little or no vapor is lost during the process and the wheels may be continuously passed through the vapor zone on a conveyor where the wheels may be placed immediately upon removal from the mold. The density of the vapor aids in its retention within the apparatus. The conveyor immerses the wheels in the vapor through the cooling blanket and removes the wheels from the vapor after the de-flashing operation is complete. After cooling, the wheels may be removed from the conveyor in finished condition ready for inspection and packing.

It is, of course, understood that sprues and bleeders must be removed manually before the vapor buffing begins in view of their heavy cross section. Similarly, if excessive flash is present, it may prove useful to cut this off roughly without attempting to trim and let the vapor buffing complete the operation.

Contamination of the solvent by the dissolved flash should be maintained at a satisfactory level by distillation of the solvent at suitable periods or by continuous distillation of portions of the solvent. A suitable distillation unit is shown in the aforementioned duPont publication.

Wheels treated by the method described have a high gloss and show no flash marks where the flash has been removed therefrom. In fact, the wheels have a better appearance than wheels processed under the normal conditions of manual deflashing and manual buffing. It is apparent that the operation is of considerably lower cost since it eliminates the necessity of manual labor to cut the flash from the wheels and to buff the wheels and it also eliminates the possibility of injury to the wheels by the manual operations whereby the cost of the entire operation is drastically reduced and a better product is obtained.

While the embodiments of the invention as herein disclosed constitute preferred forms, it is to be understood that other forms might be adopted.

What is claimed is as follows:

1. In a method for de-flashing and enhancing the surface appearance of cellulose acetate butyrate or cellulose acetate propionate plastic articles, the steps comprising; immersing articles having a relatively thick portion of the aforementioned plastic and a relatively thin section of unwanted flash in a vapor bath of an organic solvent taken from the class consisting of ketones, esters and trichloroethylene maintained at a temperature above the boiling point of the solvent and below 250° F. for a time sufficient to dissolve the flash from the article and simultaneously enhance the surface finish thereof, and then removing the articles from the solvent vapor bath and allowing them to cool whereby a high gloss surface finish is obtained free from flash.

2. In a method for finishing a steering wheel, comprising a metal spider covered with a relatively thick layer of cellulose acetate butyrate or cellulose acetate propionate including thin flash thereon, the steps comprising; immersing the wheel in a vapor bath of an organic solvent taken from the class consisting of ketones, esters and trichloroethylene and maintained at a temperature above the boiling point of the solvent and below 250° F. for a time sufficient to dissolve the flash and level out the surface of the plastic material for improving its appearance, and then removing the wheel from the vapor bath.

3. In a method for finishing a steering wheel, comprising a metal spider covered with a relatively heavy layer of cellulose acetate butyrate or cellulose acetate propionate including a relatively thin flash thereon, the steps comprising; immersing the wheel in a vapor bath of trichloroethylene maintained at a temperature of from 190° F. to 195° F. for a period of from 2 to 1 minutes respectively, and then removing the wheel from the vapor bath.

4. In a method for finishing a steering wheel, comprising a metal spider covered with a relatively thick layer of cellulose acetate butyrate or cellulose acetate propionate including a relatively thin flash thereon, the steps comprising; immersing the wheel in a vapor bath of methyl ethyl ketone maintained at a temperature of from 160° F. to 195° F. for a period of from 2 to 1 minutes respectively and then removing the wheel from the vapor bath.

References Cited in the file of this patent
UNITED STATES PATENTS

| | | |
|---|---|---|
| 826,791 | Lutter | July 24, 1906 |
| 1,657,870 | Sherts | Jan. 31, 1928 |
| 2,271,192 | Hinz | Jan. 27, 1942 |
| 2,371,647 | Petering et al. | Mar. 20, 1945 |
| 2,422,017 | Hunt | June 10, 1947 |
| 2,651,811 | Coney | Sept. 15, 1953 |
| 2,799,636 | MacLachlan | July 16, 1957 |
| 2,887,366 | Oberdorfer | May 19, 1959 |